(No Model.)
M. HEY.
STEAM TRAP.
No. 508,708. Patented Nov. 14, 1893.
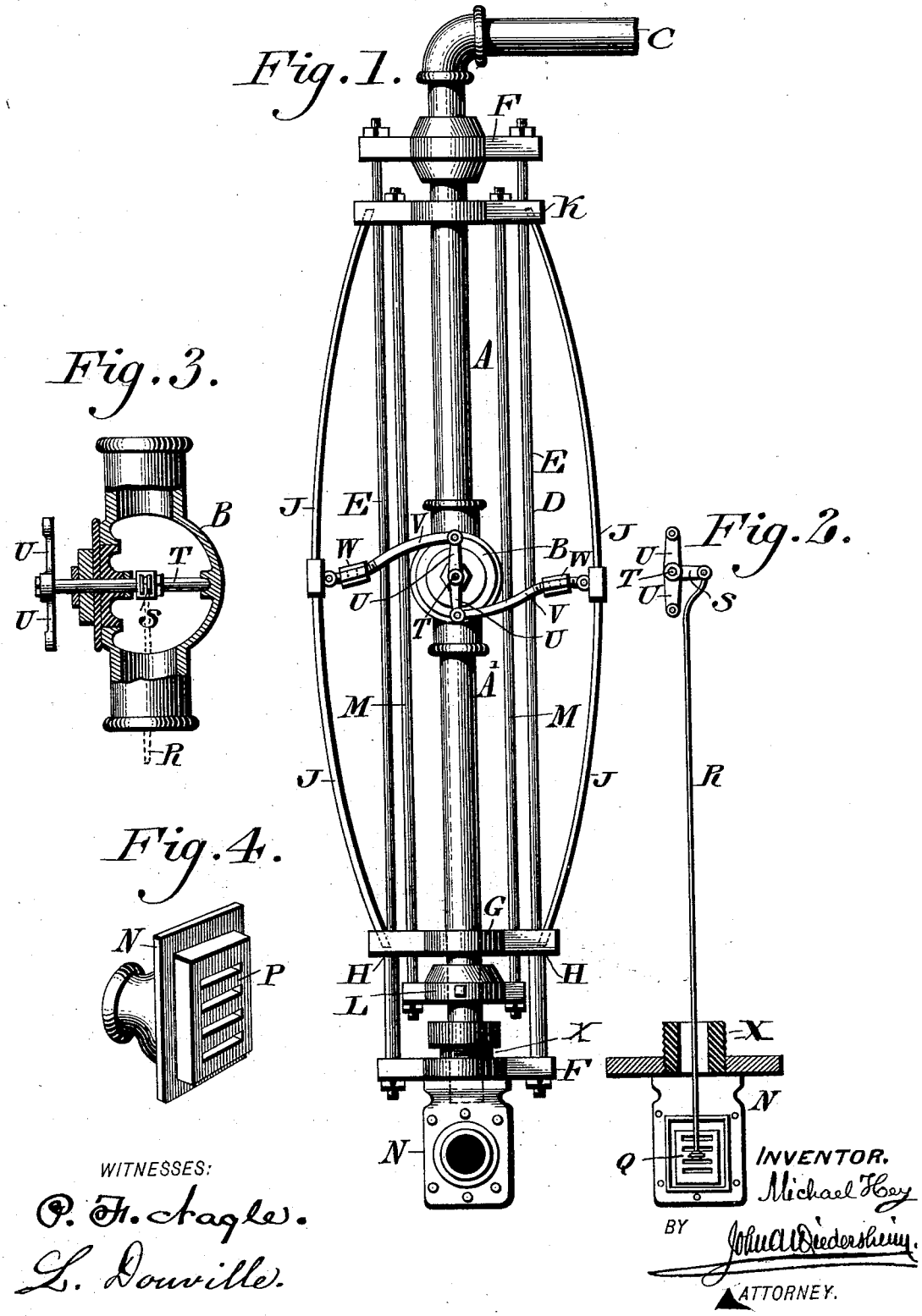
WITNESSES:
INVENTOR.
Michael Hey
BY
ATTORNEY.

UNITED STATES PATENT OFFICE.

MICHAEL HEY, OF PHILADELPHIA, PENNSYLVANIA.

STEAM-TRAP.

SPECIFICATION forming part of Letters Patent No. 508,708, dated November 14, 1893.
Application filed July 12, 1893. Serial No. 480,200. (No model.)

*To all whom it may concern:*

Be it known that I, MICHAEL HEY, a citizen of the United States, residing in the city and county of Philadelphia, State of Pennsylvania, have invented a new and useful Improvement in Steam-Traps, which improvement is fully set forth in the following specification and accompanying drawings.

My invention consists of a steam trap in which the expansion of a steam-receiving pipe is employed to close the valve thereof, whereby steam is prevented from escaping, and the contraction of the same causes the valve to open, whereby the water of condensation is permitted to be discharged, the construction of the parts of the trap being hereinafter set forth.

Figure 1 represents a side elevation of a steam trap embodying my invention. Fig. 2 represents a vertical section of a portion thereof. Fig. 3 represents a vertical section of the center-piece or chambered coupling of the device. Fig. 4 represents a perspective view of a portion of the valve of the device.

Similar letters of reference indicate corresponding parts in the several figures.

Referring to the drawings: A, A', designate two sections of a pipe, which are connected by the chambered coupling B, the section A being in communication with a steam-supply pipe C.

D designates a frame consisting of rods E, which are connected at top and bottom with brackets F, the latter being fitted on the sections A, A'.

On the section A' is a bracket G, which is sustained on the pipes or shoulders H of the rods E, said bracket having connected with it the spring or plate springs J, whose upper ends are secured to a sliding bracket K, which is freely fitted on the rods E.

Firmly secured to the section A', below the bracket G is a collar L, which is connected with the sliding bracket K, by means of rods M, the latter passing freely through the bracket G.

Connected with the lower end of the section A' is a valve shell N, the same containing a seat P and slide valve Q whose stem R passes upward through the section A', and is connected by a crank arm S in the chamber of the coupling B, with a rotating shaft T, the latter being mounted on the coupling B and having on its outer ends the crank arms U, to which are respectively attached the links V, whose outer ends are connected with the centers of the springs J, said links being in sections joined by nuts W for adjusting the lengths of said sections and the throw of the valve Q with which they are indirectly connected.

The operation is as follows: The water of condensation may escape from the pipe A as the valve Q is open. When however, steam enters said pipe, the latter becomes highly heated, whereby it expands, thus moving the collar L which is firmly connected with it. This draws the loose bracket K toward said collar L, and as the springs J are attached to said bracket K, and likewise to the stationary bracket G, they are forced outwardly or contracted, whereby motion is imparted to the links V, the arms U, the shaft T, crank arm S and valve stem R, and thus the valve is closed and the steam retained in the pipes A, A'. When the steam condenses the pipe A accordingly cools and contracts, whereby the collar L is restored to its normal position and the springs J expand, and owing to the connected parts, the valve is opened and the water of condensation escapes.

X designates a stuffing box for forming a tight joint between the pipe A and valve casing N.

Having thus described my invention, what I claim as new, and desire to secure by Letters Patent, is—

1. A steam-receiving pipe, a frame thereon, a sliding bracket on said frame, a collar fixed to said pipe a connection for said bracket and collar, a spring attached to said bracket, a link secured to said spring, a rotary shaft connected with said link, and a valve in communication with said pipe, the stem of said valve being connected with said shaft, said parts being combined substantially as described, whereby the expansion and contraction of said pipe cause the closing and opening of said valve in the manner stated.

2. In a steam trap, a valve, a rotary shaft with a crank arm thereon, the valve stem being connected with said valve and arm, and a spring attached to said shaft, in combination with a steam-receiving pipe having a collar fixed thereto, and a movable bracket connected with said collar and spring, the parts operating together, substantially as described.

3. In a steam trap substantially as described the pipe A, the spring J and the shaft T to which the valve stem and said spring are attached, in combination with the link V intermediate of said spring and shaft, said link being formed in sections connected by a set nut W for the purpose set forth.

4. In a steam trap, a sectional pipe having a chambered coupling, a frame formed of rods, and brackets on said pipe, a collar secured to said pipe, a sliding bracket connected by rods with said collar, a bracket sustained on shoulders of the frame rods, springs connected with said last mentioned bracket and said sliding bracket, a valve shell connected with said pipe, a valve in said shell with its stem in said pipe, and mechanism substantially as described connected with said valve stem and springs for operating said valve, said parts being combined substantially as described.

MICHAEL HEY.

Witnesses:
JOHN A. WIEDERSHEIM,
A. P. JENNINGS.